(12) United States Patent
Liou et al.

(10) Patent No.: US 12,518,469 B2
(45) Date of Patent: Jan. 6, 2026

(54) DISPLAY DEVICE WITH THREE-DIMENSIONAL IMAGE DISPLAY FUNCTION AND THREE-DIMENSIONAL IMAGE DISPLAY METHOD

(71) Applicant: Innolux Corporation, Miaoli County (TW)

(72) Inventors: Hao-Yu Liou, Miaoli County (TW); Ruey-Jer Weng, Miaoli County (TW); Naoki Sumi, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 413 days.

(21) Appl. No.: 18/156,348

(22) Filed: Jan. 18, 2023

(65) Prior Publication Data
US 2023/0267673 A1    Aug. 24, 2023

Related U.S. Application Data

(60) Provisional application No. 63/311,454, filed on Feb. 18, 2022.

(30) Foreign Application Priority Data

Nov. 30, 2022   (CN) .......................... 202211519451.7

(51) Int. Cl.
*G06T 15/06*   (2011.01)
*G06F 3/01*    (2006.01)
(Continued)

(52) U.S. Cl.
CPC .............. *G06T 15/06* (2013.01); *G06F 3/013* (2013.01); *G06T 15/08* (2013.01); *G06V 10/245* (2022.01)

(58) Field of Classification Search
CPC .... H04N 13/383; H04N 13/302; G06F 3/013; G06T 15/06; G06T 15/08; G06V 10/245
See application file for complete search history.

(56) References Cited

U.S. PATENT DOCUMENTS 11,308,681 B1 *   4/2022   Seiler ...................... G06F 3/013
11,487,360 B1 *  11/2022   Lan ....................... G06V 40/166
(Continued)

FOREIGN PATENT DOCUMENTS

CN         103018915         4/2013
CN         105072431         11/2015
(Continued)

OTHER PUBLICATIONS

"Office Action of Europe Counterpart Application", issued on Feb. 5, 2025, p. 1-p. 7.
(Continued)

*Primary Examiner* — Phi Hoang
(74) *Attorney, Agent, or Firm* — JCIPRNET (57) ABSTRACT

A three-dimensional image display method and a display device with a three-dimensional image display function are provided. The three-dimensional image display method includes following steps: obtaining first volume data and defining a plurality of coordinates of a plurality of voxels in the first volume data in a display device coordinate system to generate second volume data; obtaining two first eye coordinates and converting the two first eye coordinates to the display device coordinate system to generate two second eye coordinates; calculating a plurality of ray paths corresponding to a plurality of pixels of the display device; matching the ray paths with the two second eye coordinates to determine a plurality of ray casting paths; determining a plurality of sampling data corresponding to the pixels
(Continued)

according to the second volume data and the ray casting paths to generate display data.

20 Claims, 12 Drawing Sheets

(51) Int. Cl.
*G06T 15/08* (2011.01)
*G06V 10/24* (2022.01)

(56) References Cited

U.S. PATENT DOCUMENTS

| | | | | |
|---|---|---|---|---|
| 2015/0117737 | A1* | 4/2015 | Kim | A61B 5/0033 382/131 |
| 2017/0330367 | A1* | 11/2017 | Chang | G06T 15/60 |
| 2020/0302683 | A1* | 9/2020 | Huang | G06T 15/503 |
| 2020/0368616 | A1* | 11/2020 | Delamont | H04N 13/239 |
| 2020/0371587 | A1* | 11/2020 | Mihali | G06F 3/04845 |
| 2021/0400249 | A1* | 12/2021 | Edmonds | G06T 7/40 |
| 2024/0211033 | A1* | 6/2024 | Wang | A61B 5/6814 |

FOREIGN PATENT DOCUMENTS

| | | |
|---|---|---|
| EP | 1056049 | 11/2000 |
| EP | 2562581 | 2/2013 |
| EP | 2801200 | 11/2014 |
| EP | 2811746 | 12/2014 |
| EP | 2849443 | 3/2015 |

OTHER PUBLICATIONS

"Search Report of Europe Counterpart Application", issued on Sep. 26, 2023, p. 1-p. 10.

* cited by examiner

DISPLAY DEVICE WITH THREE-DIMENSIONAL IMAGE DISPLAY FUNCTION AND THREE-DIMENSIONAL IMAGE DISPLAY METHOD

CROSS-REFERENCE TO RELATED APPLICATION

This application claims the priority benefit of U.S. provisional application Ser. No. 63/311,454, filed on Feb. 18, 2022, and China application serial no. 202211519451.7, filed on Nov. 30, 2022. The entirety of each of the above-mentioned patent applications is hereby incorporated by reference herein and made a part of this specification.

BACKGROUND

Technical Field

The disclosure relates to an image display technology; more particularly, the disclosure relates to a display device with a three-dimensional image display function and a three-dimensional image display method.

Description of Related Art

According to conventional medical image display technologies, in most cases, display devices are applied to display two-dimensional medical images obtained through computed tomography (CT) scan, which requires complicated operations by medical personnel to obtain the scanned results of the entire scanned object. Therefore, the medical personnel cannot quickly and instantly obtain the required information through the two-dimensional medical images displayed on the display devices while performing other operations at the same time.

SUMMARY

The disclosure provides a display device with a three-dimensional image display function and a three-dimensional image display method, so as to achieve the favorable three-dimensional image display function.

An embodiment of the disclosure provides a three-dimensional image display method that includes following steps. First volume data are obtained, and a plurality of coordinates of a plurality of voxels in the first volume data in a display device coordinate system is defined to generate second volume data. Two first eye coordinates are obtained, and the two first eye coordinates are converted to the display device coordinate system to generate two second eye coordinates. A plurality of ray paths corresponding to a plurality of pixels of the display device is calculated. The ray paths are matched with the two second eye coordinates to determine a plurality of ray casting paths. A plurality of sampling data corresponding to the pixels is determined according to the second volume data and the ray casting paths to generate display data.

An embodiment of the disclosure provides a display device having a three-dimensional image display function, and the display device includes a processor and a sensor. The processor is configured to obtain first volume data and respectively define a plurality of coordinates of a plurality of voxels in the first volume data in a display device coordinate system to generate second volume data. The sensor is coupled to the processor and configured to obtain two first eye coordinates. The processor converts the two first eye coordinates to the display device coordinate system to generate two second eye coordinates and calculates a plurality of ray paths corresponding to a plurality of pixels of the display device. The processor matches the ray paths with the two second eye coordinates to determine a plurality of ray casting paths and determines a plurality of sampling data corresponding to the pixels according to the second volume data and the ray casting paths to generate display data.

In light of the above, according to the display device having the three-dimensional image display function and the three-dimensional image display method provided in one or more embodiments of the disclosure, locations of eyes of a viewer may be automatically sensed, and the ray casting paths of the pixels in the display device are determined according to the locations of the eyes of the viewer, so that the display device is able to provide the three-dimensional display effects to the viewer.

In order for the features and advantages of the disclosure to be more comprehensible, the following specific embodiments are described in detail in conjunction with the drawings.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Certain terminologies throughout the description and the following claims serve to refer to specific components. As will be understood by those skilled in the art, electronic device manufacturers may denote components by different names. It is not intended to distinguish the components that differ by name but not by function. In the following specification and claims, the terminologies "including," "comprising," "having," etc. are open-ended terminologies, so they should be interpreted to mean "including but not limited to . . . ".

In some embodiments of the disclosure, terminologies in association with bonding and connection, such as "being coupled to" and "interconnection", unless otherwise specified, may mean that two structures are in direct contact, or two structures are not in direct contact, where other structures are placed between the two structures. Besides, the terminologies in association with bonding and connection may also refer to the situation that both structures are movable, or both structures are fixed. In addition, the terminology "being coupled to" used herein includes any direct or indirect electrical connection means.

The ordinal numbers used in the specification and claims, such as the terminologies "first," "second," and the like, to qualify a component do not imply or represent that the component or components are preceded with any ordinal numbers, nor do they represent the order of a certain component and another component, or the order in the manufacturing method, and are used to clearly distinguish a component with one name from another component with the same name. Different terminologies may be used in the claims and the specification, and accordingly, a first component in the specification may be a second component in the claims. Note that in the following embodiments, the technical features provided in several different embodiments may be replaced, reorganized, and mixed without departing from the spirit of the disclosure so as to complete other embodiments.

Figure 1:
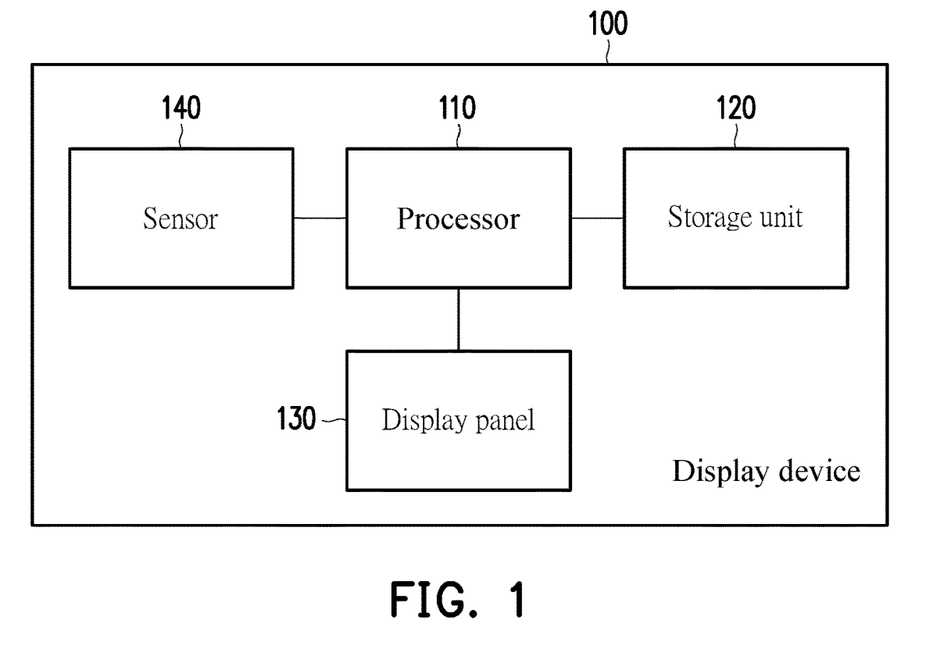
FIG. 1 is a schematic view illustrating a circuit of a display device according to an embodiment of the disclosure.

FIG. 1 is a schematic view illustrating a circuit of a display device according to an embodiment of the disclosure. With reference to FIG. 1, a display device 100 includes a processor 110, a storage unit 120, a display panel 130, and a sensor 140.

The processor 110 is coupled to the storage unit 120, the display panel 130, and the sensor 140. The display device 100 may be a naked-eye three-dimensional image display device with a three-dimensional image display function. In an embodiment, the processor 110 and the storage unit 120 may also be integrated in an external host device, and the display panel 130 and the sensor 140 may be integrated in the display device. The external host device and the display device may be connected through a cable or in a wireless manner.

In this embodiment, the processor 110 may include, for instance, a central processing unit (CPU) or any other programmable general-purpose or special-purpose microprocessor, digital signal processor (DSP), application special application integrated circuit (ASIC), programmable logic device (PLD), any other similar processing circuit, or a combination thereof. In this embodiment, the storage unit 120 may include a memory and/or a database. The storage device 120 may be, for instance, a non-volatile memory (NVM). The storage device 120 may store relevant programs, modules, systems, or algorithms configured to realize one or more embodiments of the disclosure, so that the processor 110 may access and execute relevant functions and operations described in one or more embodiments of the disclosure for such realization.

In this embodiment, the display panel 130 may include, for instance, liquid crystal and light emitting diodes (LED). The LED may, for instance, include an organic LED (OLED), a mini LED, a micro LED, a quantum dot LED (QLED or QDLED), fluorescence, phosphor, or any other appropriate material, and these materials may be arranged and combined in any manner, which should however not be construed as a limitation in the disclosure.

In this embodiment, the sensor 140 may be an eye tracker, an image sensor, an infrared (IR) sensor, and so forth, and the sensor 140 is configured to track locations of human eyes. The sensor 140 may directly transmit corresponding coordinate information to the processor 110 or provide a visible light image or an IR image to the processor 110, so that the processor 110 may analyze the visible light image or the IR image to obtain the corresponding coordinate information.

Figure 2:
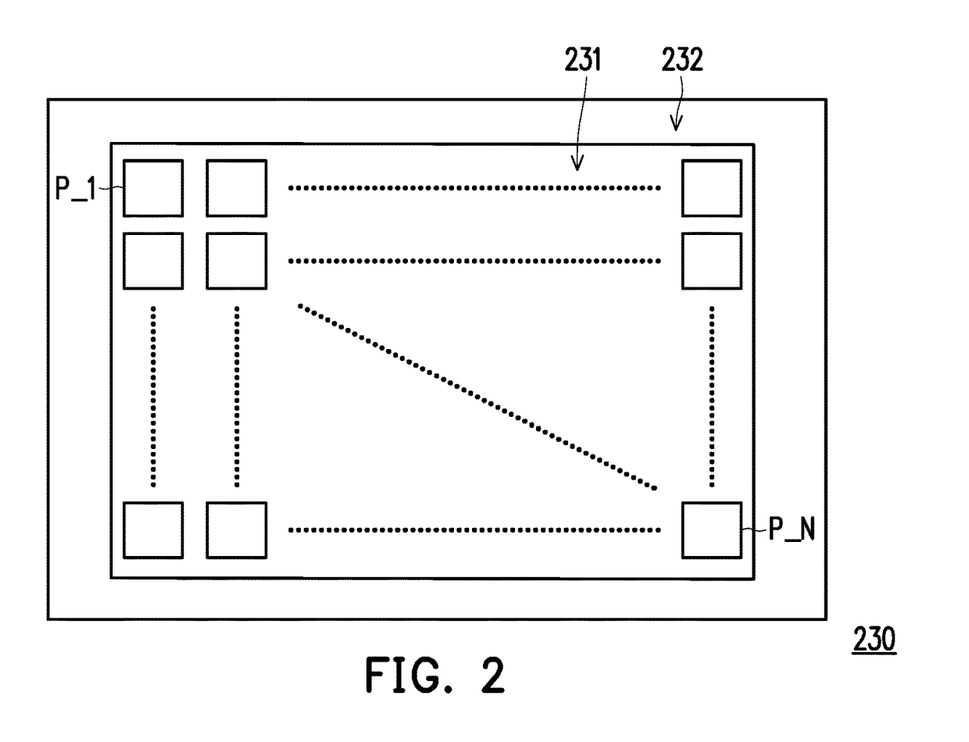
FIG. 2 is a schematic view illustrating a display panel according to an embodiment of the disclosure.

FIG. 2 is a schematic view illustrating a display panel according to an embodiment of the disclosure. With reference to FIG. 2, the display panel provided in the disclosure may be realized in form of a display panel 230 shown in FIG. 2. The display panel 230 may include an active area (AA) 231 and a peripheral area 232. The display panel 230 may include a pixel array disposed in the AA 231. The pixel array includes a plurality of pixels P_1-P_N, and each of the pixels P_1-P_N may include a plurality of sub-pixels (such as a red sub-pixel, a green sub-pixel, and a blue sub-pixel), where N is positive integer. In this embodiment, the sensor 140 may be disposed at any location in the peripheral region 232 of the display panel 230 to sense and observe the locations of the human eyes of a viewer who is watching the display device, which should however not be construed as a limitation in the disclosure. In an embodiment, the sensor 140 may also be disposed in a middle location or another location in the AA 231 of the display panel 230.

Figure 3:
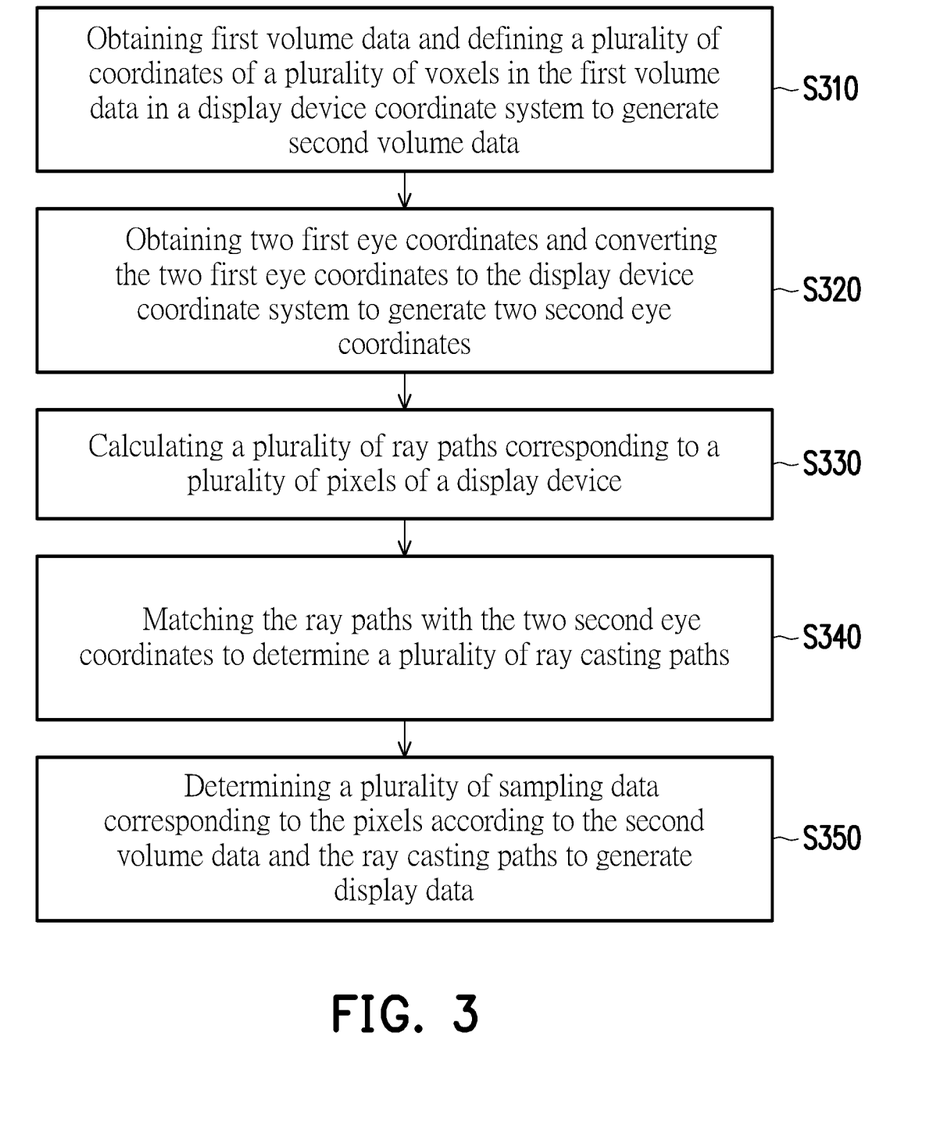
FIG. 3 is a flowchart of a three-dimensional image display method according to an embodiment of the disclosure.

FIG. 3 is a flowchart of a three-dimensional image display method according to an embodiment of the disclosure. With reference to FIG. 1 and FIG. 3, the display device 100 may be operated according to following steps S310-350, so as to achieve the three-dimensional image display function. In step S310, the processor 110 may obtain first volume data and define a plurality of coordinates of a plurality of voxels in the first volume data in a display device coordinate system to generate second volume data. In this embodiment, the first volume data may be composed of multi-layer two-dimensional medical image data, which should however not be construed as a limitation in the disclosure. In an embodiment, the first volume data may also be image data in other application fields, so that the display device 100 may display three-dimensional images in other application fields. The two-dimensional medical image data may be, for instance, CT scan images, magnetic resonance imaging (MRI) images, automated breast ultrasound system (ABUS) images, and so forth. Here, the processor 110 may first receive the multi-layer two-dimensional medical images which are input from the outside and respectively correspond to different heights (continuous heights), so as to obtain the first volume data. The first volume data may be data of radiation absorption values corresponding to each voxel of the three-dimensional images created after spatial combination of the two-dimensional medical images, which should however not be construed as a limitation in the disclosure. The processor 110 may perform a stereoscopic data reconstruction operation on the first volume data according to view angles of the currently viewed medical image content, so as to write a coordinate parameter into each voxel in the display device coordinate system to generate second volume data.

It should be noted that the terminology "three-dimensional" mentioned in this embodiment may be composed of a first direction, a second direction, and a third direction, and the three directions may define three planes. In detail, the first direction, the second direction, and the third direction may be perpendicular to one another; alternatively, the first direction and the second direction are perpendicular to each other, and the third direction is neither perpendicular to the first direction nor perpendicular to the second direction; in another alternative, the first direction, the second direction, and the third direction are not perpendicular to one another, which should however not be construed as a limitation in the disclosure.

Figure 4:
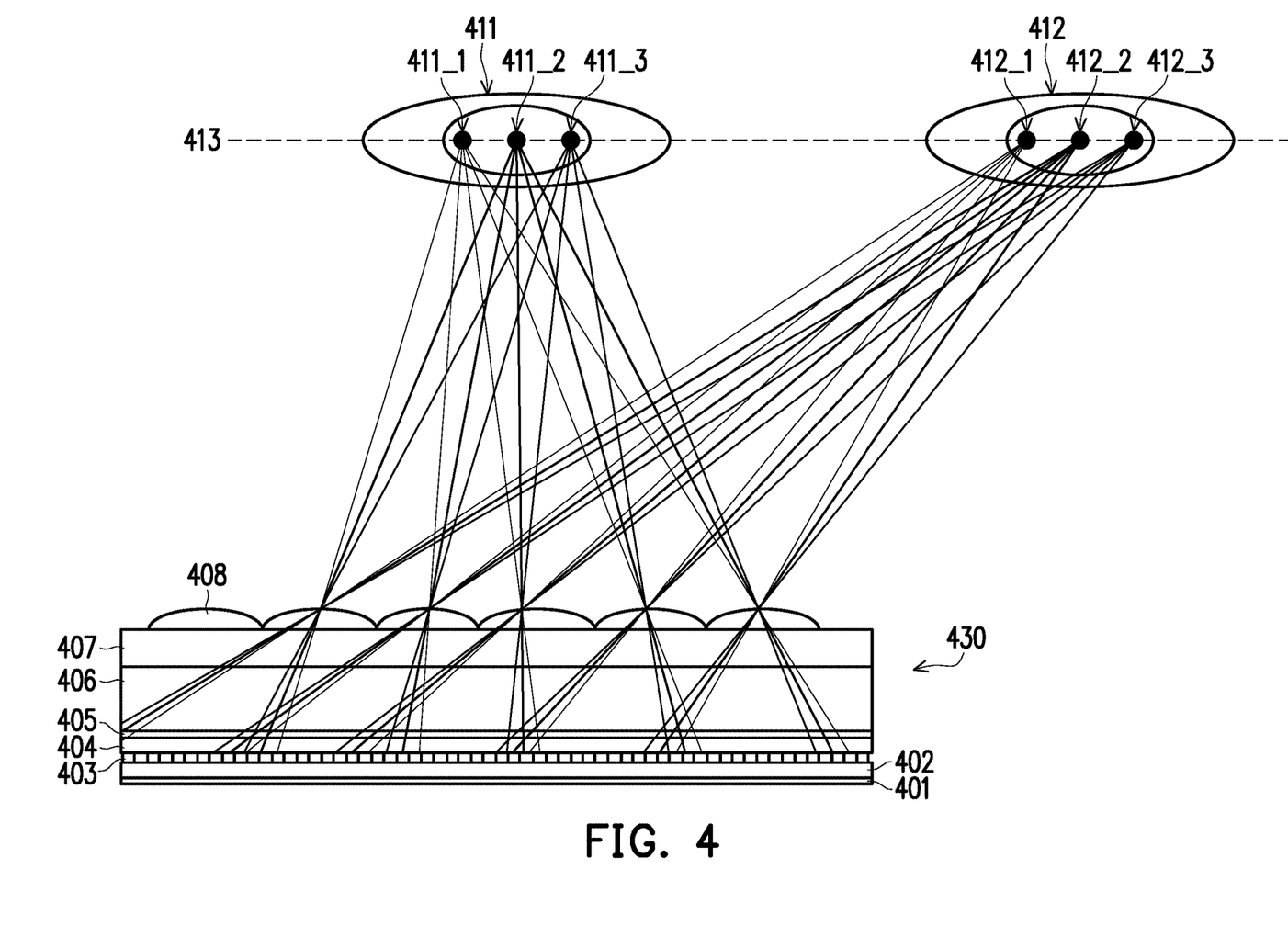
FIG. 4 is a schematic view illustrating location relations between eyes and a display device according to an embodiment of the disclosure.

In step S320, the processor 110 may obtain two first eye coordinates and convert the two first eye coordinates to the display device coordinate system to generate two second eye coordinates. In this embodiment, the processor 110 may sense locations of both eyes of the viewer through the sensor 140 to obtain the two first eye coordinates corresponding to the locations of the centers of the pupils of both eyes. Please refer to FIG. 4, which is a schematic view illustrating location relations between eyes and a display device according to an embodiment of the disclosure. It should be noted that FIG. 4 is a schematic side view of the display device 100, and the relations between the locations of both eyes of the viewer and the display device in the actual three-dimensional space may be deduced therefrom. In this embodiment, the sensor 140 may sense locations of an eye 411 and an eye 412 of the viewer and return two first eye coordinates of the eye 411 and the eye 412 to the processor 110, where the two first eye coordinates are generated based on a sensor coordinate system. In an embodiment, the sensor 140 may also sense a middle location between the eye 411 and the eye 412 of the viewer and further calculate the two first eye coordinates of the eye 411 and the eye 412 according to a predetermined pupillary distance. In this embodiment, the processor 110 may perform corresponding coordinate conversion calculations to convert the two first eye coordinates from the sensor coordinate system to the display device coordinate system, so as to generate the two second eye coordinates in the display device coordinate system.

In step S330, the processor 110 may calculate a plurality of ray paths corresponding to a plurality of pixels of the display device 100. With reference FIG. 4, in this embodiment, the display panel 130 of the display device 100 may have the structure of a display panel 430 shown in FIG. 4. The display panel 430 may include upper and lower polarizing plates 401 and 405, upper and lower glass substrates 402 and 404, a display layer 403, an adhesion layer 406, a lens substrate 407, and a lens 408 (a light splitting structure). The display layer 403 may include a plurality of pixels arranged in an array. In this embodiment, the processor 110 may first calculate ray paths of each pixel passing through the lens 408 in the display layer 403. In an embodiment, the ray paths may also correspond to a plurality of sub-pixels of the pixels in the display layer 403.

In step S340, the processor 110 may match the ray paths with the two second eye coordinates to determine a plurality of ray casting paths. As shown in FIG. 4, in this embodiment, the processor 110 may first define vision points 411_2 and 412_2 of the two second eye coordinates corresponding to the centers of the pupils of the two eyes, respectively. Next, the processor 110 may respectively align the pixels in the display layer 403 to the vision point 411_2 and the vision point 412_2 of the two second eye coordinates to determine a plurality of ray casting paths, so that at least a part of the pixels in the display layer 403 may emit images toward the vision point 411_2 and the vision point 412_2 along the ray casting paths. However, in an embodiment, the processor 110 may define a plurality of vision points 411_1-411_3 and 412_1-412_3 respectively corresponding to the two second eye coordinates along a reference line 413. Next, the processor 110 may respectively align the pixels in the display layer 403 to the vision points 411_1-411_3 and 412_1-412_3 of the two second eye coordinates to determine a plurality of ray casting paths, so that at least a part of pixels in the display layer 403 may emit images toward the vision points 411_1-411_3 and 412_1-412_3 along the ray casting paths. The vision points 411_1-411_3 and 412_1-412_3 may be located within a range of the pupils, respectively, which should however not be construed as a limitation in the disclosure. In some embodiments, the reference line 413 may be an extended connection line between two points or a vector between two points, which should however not be construed as a limitation in the disclosure. For instance, the reference line 413 may be a line connecting the centers of the pupils of the two eyes of the viewer or a vector of a start point and an end point set by the system.

Figure 5:
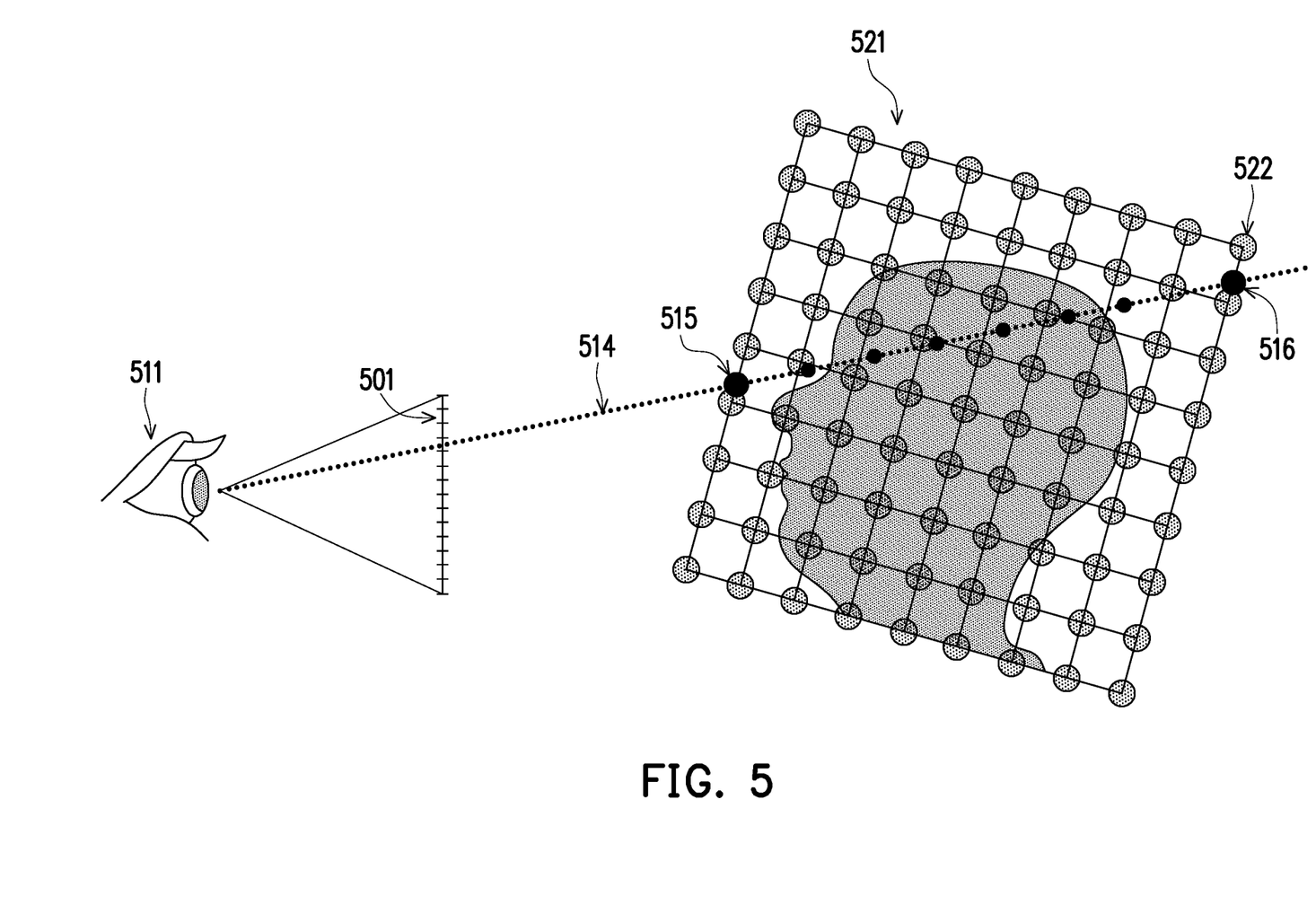
FIG. 5 is a schematic view illustrating volume data according to an embodiment of the disclosure.

In step S350, the processor 110 may determine a plurality of sampling data corresponding to the pixels according to the second volume data and the ray casting paths to generate display data. Please refer to FIG. 5, which is a schematic view illustrating volume data according to an embodiment of the disclosure. In this embodiment, the processor 110 may learn the location relations among a three-dimensional image 521, a display plane 501 of the display panel, and an eye 511 of the viewer according to corresponding coordinate parameters in the display device coordinate system in the second volume data. It should be noted that FIG. 5 is a schematic side view illustrating the location relations among the three-dimensional image 521, the display plane 501 of the display panel, and the eye 511 of the viewer, while the relations between the locations of both eyes of the viewer and the display device may be deduced therefrom. The processor 110 may calculate a plurality of numeric values corresponding to the voxels 522 passing through each of the ray casting paths in the second volume data of the three-dimensional image 521, so as to generate a plurality of composite data corresponding to the pixels and convert the composite data to the display data. As shown in FIG. 5, one ray casting path 514 is taken as an example. The processor 110 may determine the location where passes through the three-dimensional image 521 and sample a plurality of numeric values corresponding to the voxels passing through the ray casting path 514 from a start location 515 to an end location 516 in the three-dimensional image 521, where the numeric values may be, for instance, radiation absorption values, which should however not be construed as a limitation in the disclosure.

Figure 6:
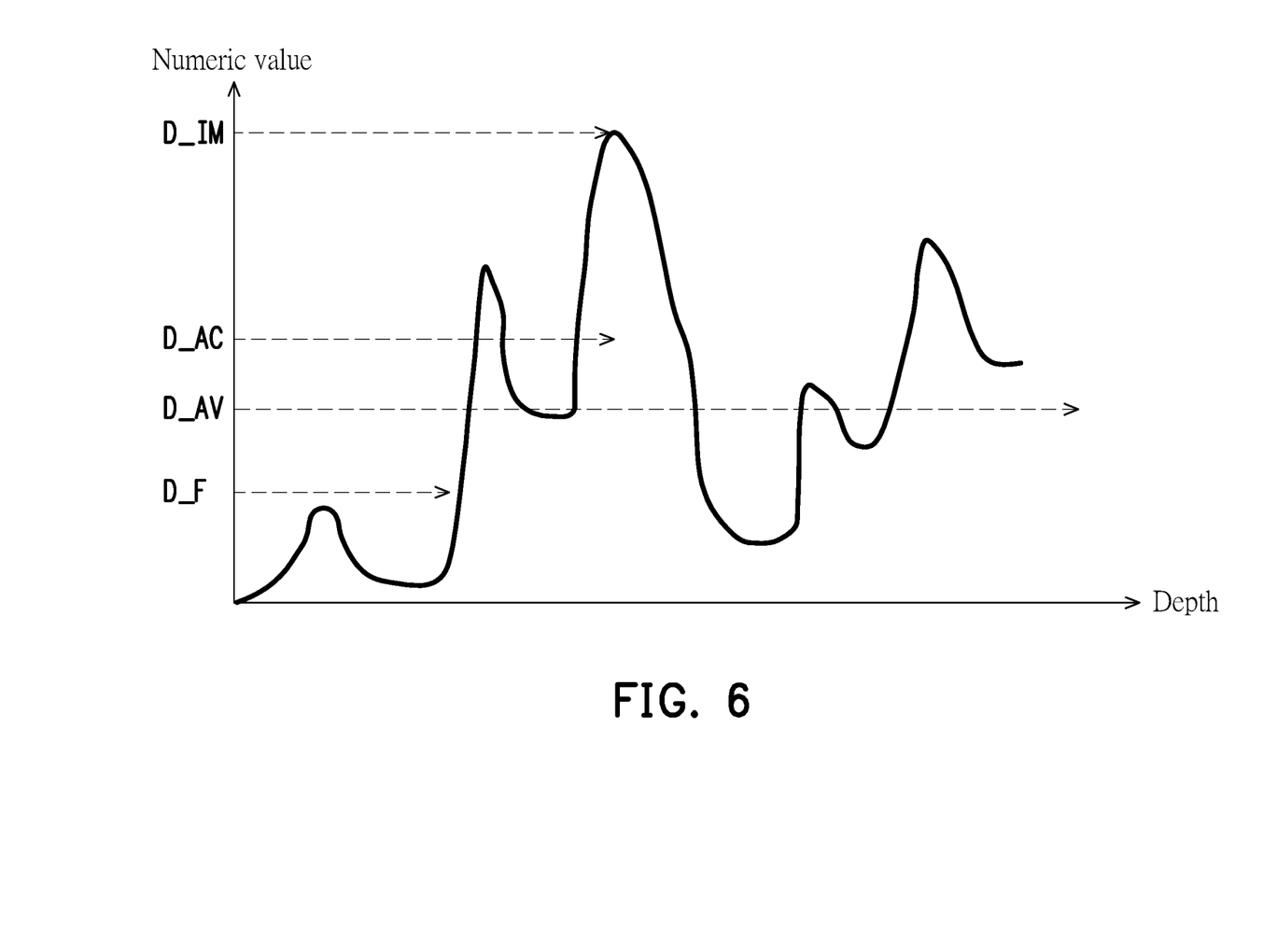
FIG. 6 is a schematic view illustrating variations in sampling data according to an embodiment of the disclosure.

Please refer to FIG. 6, which is a schematic view illustrating variations in sampling data according to an embodiment of the disclosure. The numeric values corresponding to the voxels passing through the ray casting path 514 from the start location 515 to the end location 516 in the three-dimensional image 521 may vary together with the depth, and the variations of the numeric values are exemplarily shown in FIG. 6. In this regard, the processor 110 may take a first value D_F at a predetermined depth, an average value D_AV, an accumulated value D_AC within a range of the predetermined depth, or a maximum value D_IM as the sampling data corresponding to the pixels and as the display data corresponding to the pixels. It should be noted that the "depth" herein is not limited to be in one single axial direction (e.g., a Z direction), and the "depth" may be, for instance, a vector of a voxel passing through the start location 515 in a ray path, which should however not be construed as a limitation.

Figure 7A:
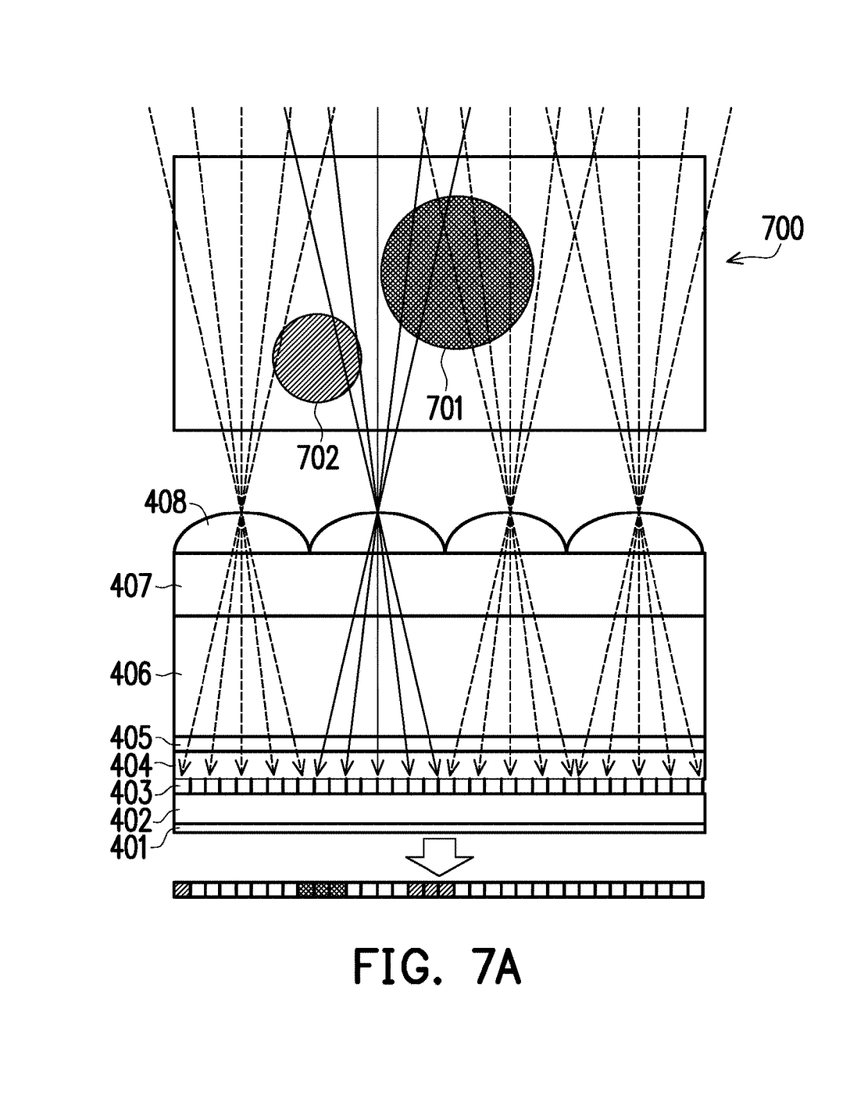
FIGS. 7A and 7B are schematic views illustrating actual display images displayed by a display device according to an embodiment of the disclosure.
Figure 7B:
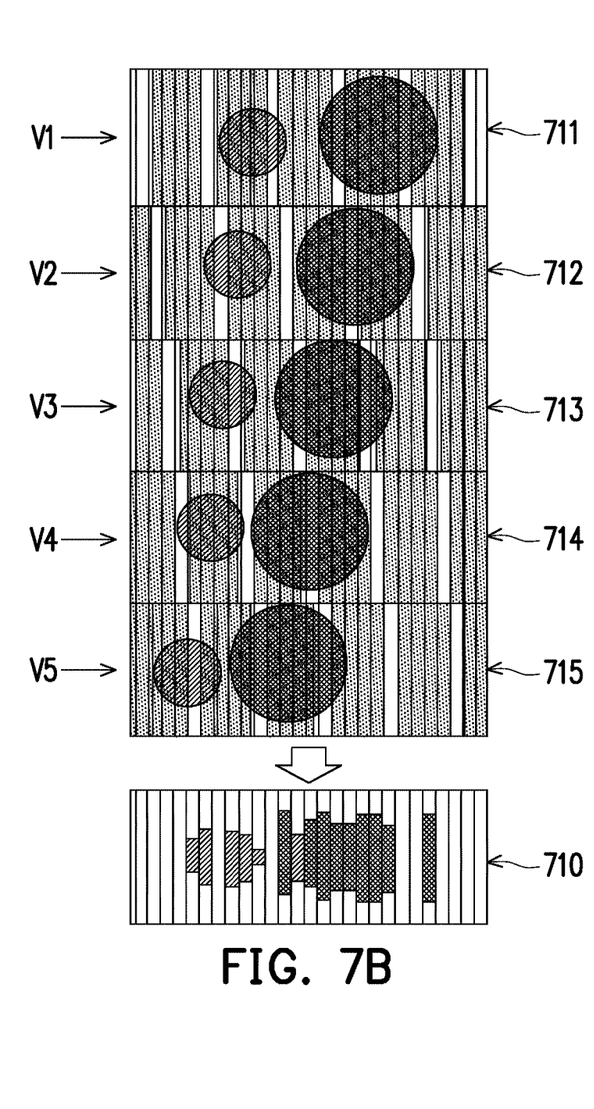

Please refer to FIG. 7A and FIG. 7B, which are schematic views illustrating actual display images displayed by a display device according to an embodiment of the disclosure. With reference to FIG. 1 and FIG. 7A, the processor 110 may combine the composite data of each ray casting path to generate an actual display screen 710 (i.e., a result of the actual three-dimensional image displayed on the planar display screen). For instance, as shown in FIG. 7A, it may be learned from the ray casting paths between a three-dimensional image 700 and the display panel 430 that an object image 701 and an object image 702 in the three-dimensional image 700 may be displayed at different corresponding locations in the actual display screen 710, respectively, for instance. With reference to FIG. 1 and FIG. 7B, a microlens may pass through the ray casting paths at 5 different view angles, which is taken as an example. In the display panel 430, the display result of the pixels of each microlens at a first view angle V1 may be the display result of a sub-image 711. Similarly, the display results of the pixels from of each microlens at a second to a fifth view angles V2-V5 in the display panel 430 may be the display results of sub-images 712-715. Thereby, after the sub-images 711-715 are superimposed, the display panel 430 may display the result of the actual display image 710 as shown in FIG. 7B. Therefore, the viewer may watch the three-dimensional display image having the three-dimensional object image 701 and the three-dimensional object image 702 through the actual display screen 710 displayed by the display panel 430.

Figure 8:
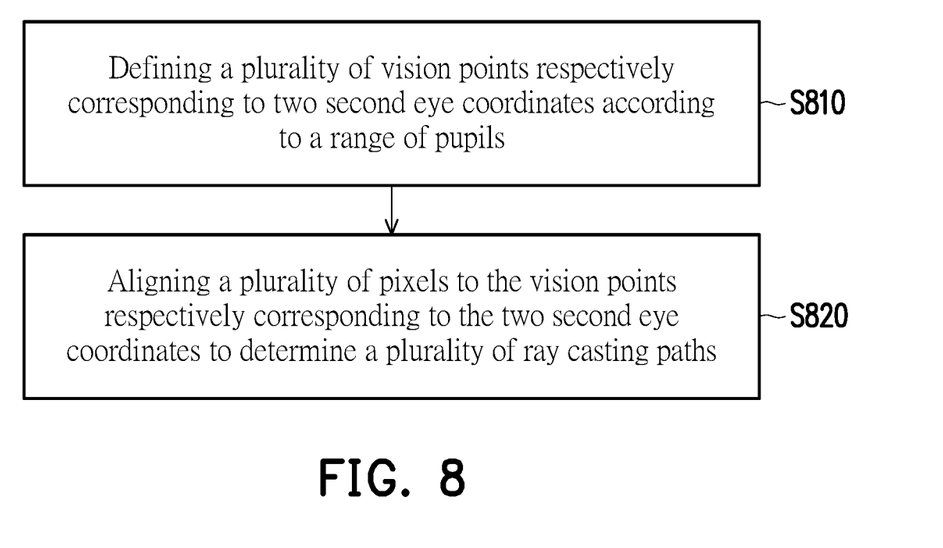
FIG. 8 is a flowchart of determining a plurality of ray casting paths according to an embodiment of the disclosure.
Figure 9A:
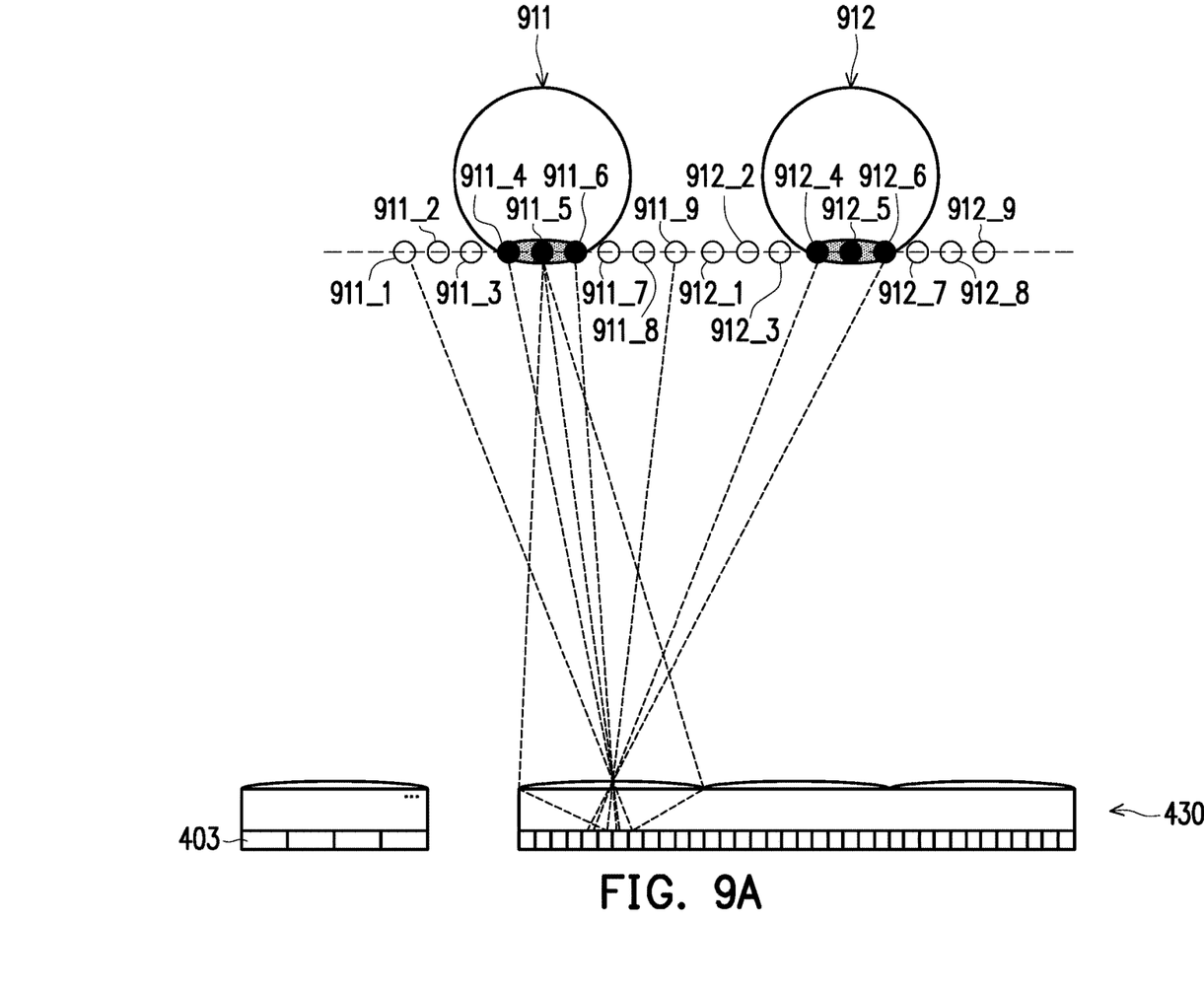
FIG. 9A is a schematic view illustrating location relations between eyes and a display device according to another embodiment of the disclosure.
Figure 9B:
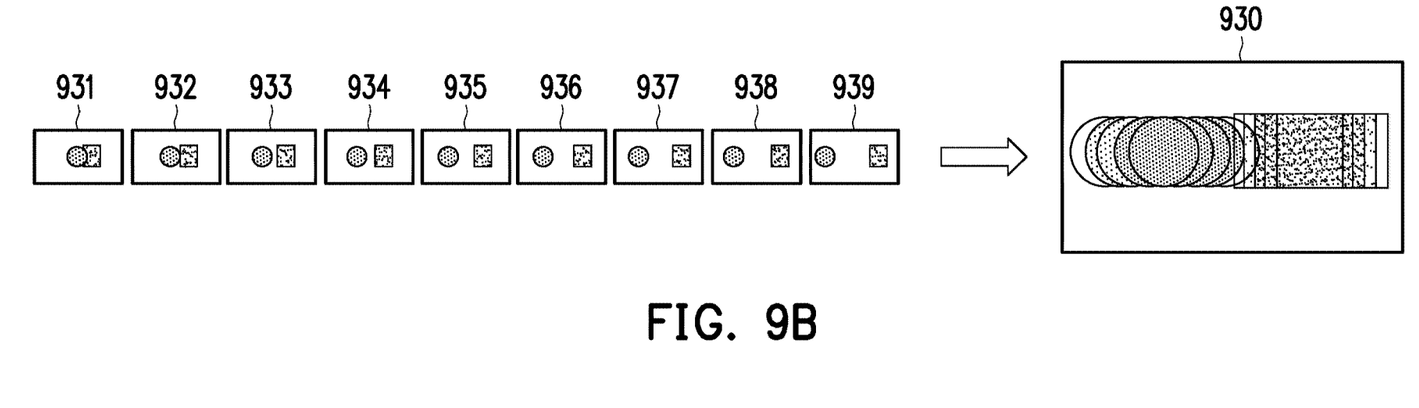
FIG. 9B is a schematic view illustrating a resultant display image observed by one eye of a viewer according to an embodiment of the disclosure.
Figure 9C:
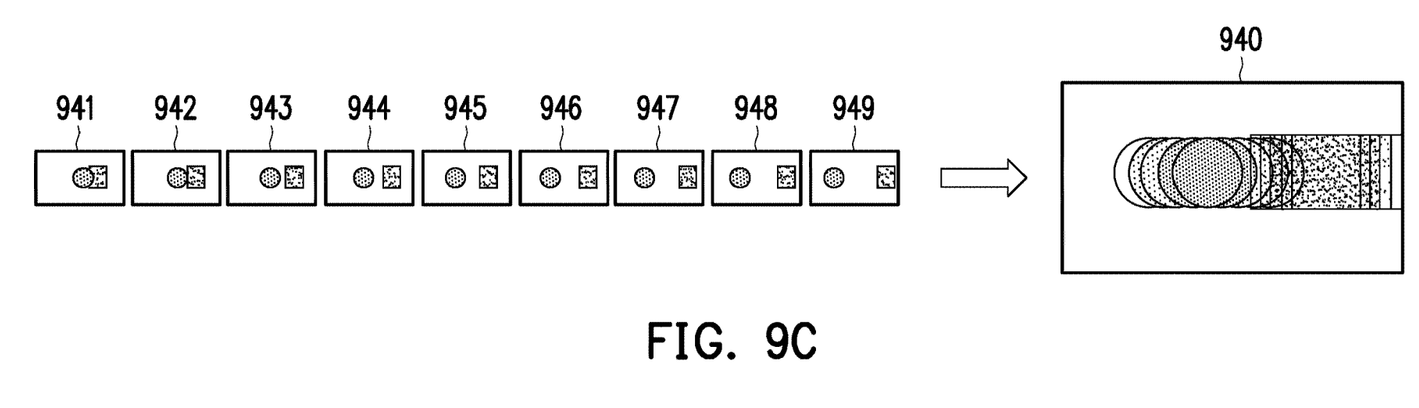
FIG. 9C is a schematic view illustrating a resultant display image observed by the other eye of the viewer according to an embodiment of the disclosure.

FIG. 8 is a flowchart of determining a plurality of ray casting paths according to an embodiment of the disclosure. FIG. 9A is a schematic view illustrating location relations between eyes and a display device according to another embodiment of the disclosure. FIG. 9B is a schematic view illustrating a resultant display image observed by one eye of a viewer according to an embodiment of the disclosure. FIG. 9C is a schematic view illustrating a resultant display image observed by the other eye of the viewer according to an embodiment of the disclosure. With reference to FIG. 1 and FIG. 8, step S810 and step S820 may be another implementation manner of step S340 described above. In step S810, the processor 110 may define a plurality of vision points respectively corresponding to two second eye coordinates according to the range of the pupils. As shown in FIG. 9A, the processor 110 may define a plurality of vision points 911_1-911_9 and 912_1-912_9 respectively corresponding to the two second eye coordinates along a reference line 913. The reference line 913 may be, for instance, the connecting line of the centers of the pupils of both eyes of the viewer. In this embodiment, the vision points 911_1-911_3, 911_7-911_9, 912_1-912_3, and 912_7-912_9 may be respectively located outside the corresponding range of the pupils, and the vision points 911_4-911_6 and 912_4-912_6 may be respectively located within the corresponding range of the pupils. Since the display light emitted by each pixel in the display layer 403 has a light emitting angle (e.g., 0.8 degrees), the display light emitted towards the vision points 911_1-911_3, 911_7-911_9, 912_1-912_3, and 912_7-912_9 outside the corresponding range of the pupils may still be received by the pupils of the viewer (i.e., an afterglow effect).

In step S820, the processor 110 may align a plurality of pixels to the vision points 911_1-911_9 and 912_1-912_9 respectively corresponding to the two second eye coordinates to determine a plurality of ray casting paths. Therefore, as shown in FIG. 9B, one eye 911 of the viewer may respectively obtain sub-images 931-939 from the vision points 911_1-911_9 and the corresponding ray casting paths, and the sub-images 931-939 may respectively have two sub-objects, for instance, where the two sub-objects have different locations in the sub-images 931-939, respectively. Therefore, the eye 911 of the viewer may actually see a display image 930 after the sub-images 931-939 are superimposed. Moreover, as shown in FIG. 9C, the other eye 922 of the viewer may respectively obtain sub-images 941-949 from the vision points 912_1-912_9 and the corresponding ray casting paths, and the sub-images 941-949 may also have two sub-objects respectively, for instance, where the two sub-objects have different locations in the sub-images 941-949, respectively. Therefore, the eye 912 of the viewer may actually see a display image 940 after the sub-images 941-949 are superimposed.

Figure 10A:
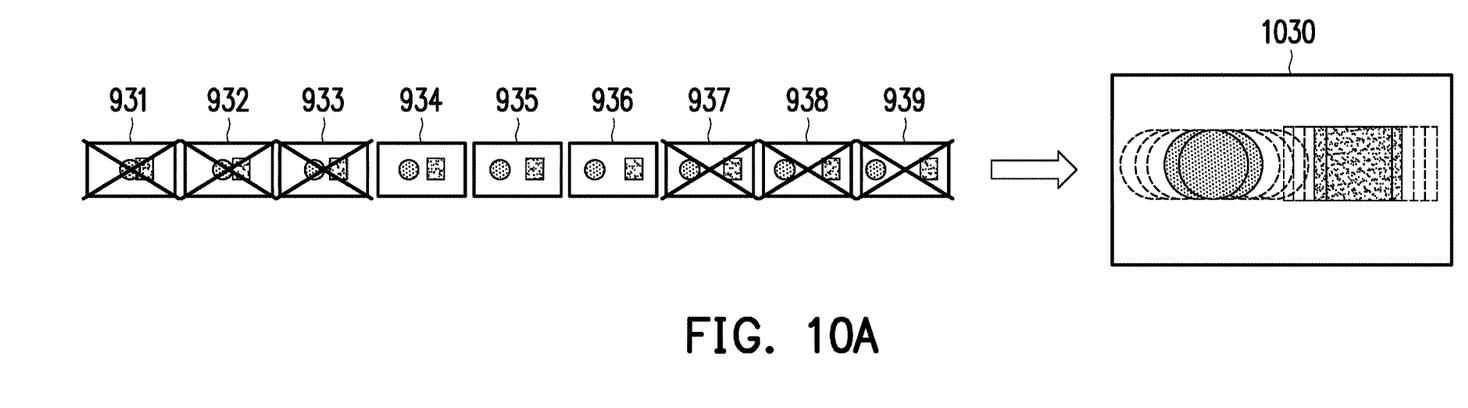
FIG. 10A is a schematic view illustrating a resultant display image observed by one eye of a viewer according to another embodiment of the disclosure.
Figure 10B:
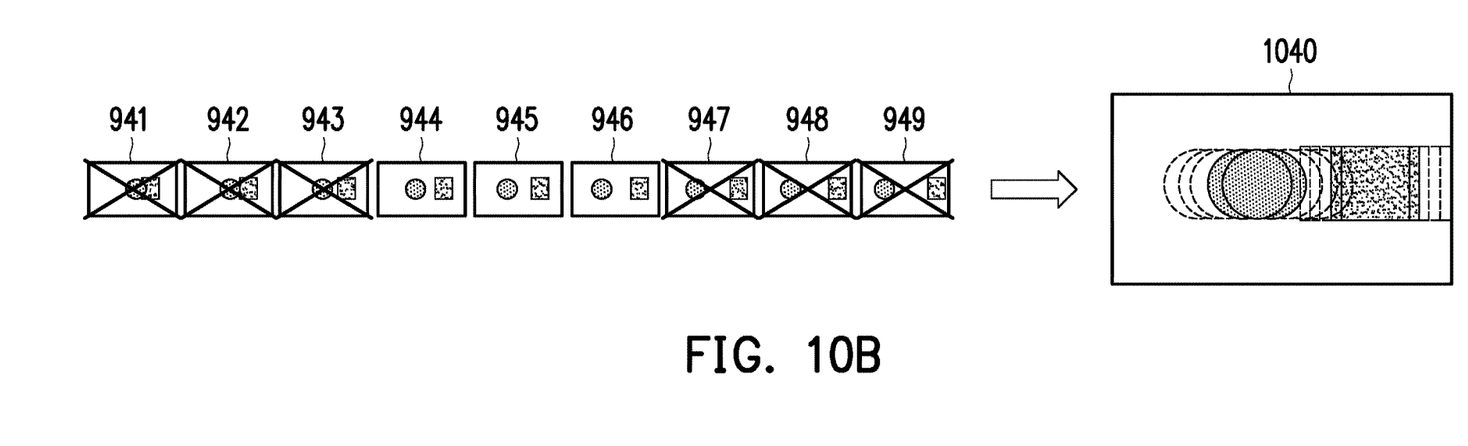
FIG. 10B is a schematic view illustrating a resultant display image observed by the other eye of the viewer according to another embodiment of the disclosure.

However, in an embodiment, the processor 110 may also place a portion of ray paths outside the range of the pupils, but a range of rays of the portion of the ray paths covers a boundary of the range of the pupils, and the pixels respectively corresponding to the portion of the ray paths are turned off. With reference to FIG. 10A and FIG. 10B, FIG. 10A is a schematic view illustrating a resultant display image observed by one eye of a viewer according to another embodiment of the disclosure, and FIG. 10B is a schematic view illustrating a resultant display image observed by the other eye of the viewer according to another embodiment of the disclosure. In an embodiment, the display light emitted by each pixel in the display layer 403 of the display panel 430 has a light emitting angle, the sub-images corresponding to the ray casting paths outside the range of the pupils may still be received by the pupils of the viewer (i.e., an afterglow effect). For instance, the ray of a pixel (or a sub-pixel) at a light emitting angle of 0 degree is projected outside the range of the pupils, and the ray of the pixel (or the sub-pixel) at a light emitting angle of ±0.3 degrees-±1.2 degrees may be projected within the range of the pupils, so that the pupils of the human eyes may receive the ray of the pixel (or the sub-pixel), which should however not be construed as a limitation in the disclosure. Thereby, as shown in FIG. 9A and FIG. 10A, the processor 110 may, for instance, turn off the pixels configured to display the sub-images 931-933 and 937-939 corresponding to the vision points 911_1-911_3 and 911_7-911_9 outside the range of the pupil in the display panel 430, so that the eye 911 of the viewer may actually see a display image 1030 with low view crosstalk after the sub-images 934-936 are superimposed. Besides, as shown in FIG. 9A and FIG. 10B, the processor 110 may, for instance, turn off the pixels configured to display the sub-images 941-943 and 947-949 corresponding to the vision points 921_1-921_3 and 921_7-921_9 outside the range of the pupil in the display panel 430, so that the eye 912 of the viewer may actually see a display image 1040 with low view crosstalk after the sub-images 944-946 are superimposed. Therefore, the eyes of the viewer may respectively see the relatively sharp display images 1030 and 1040.

Figure 11A:
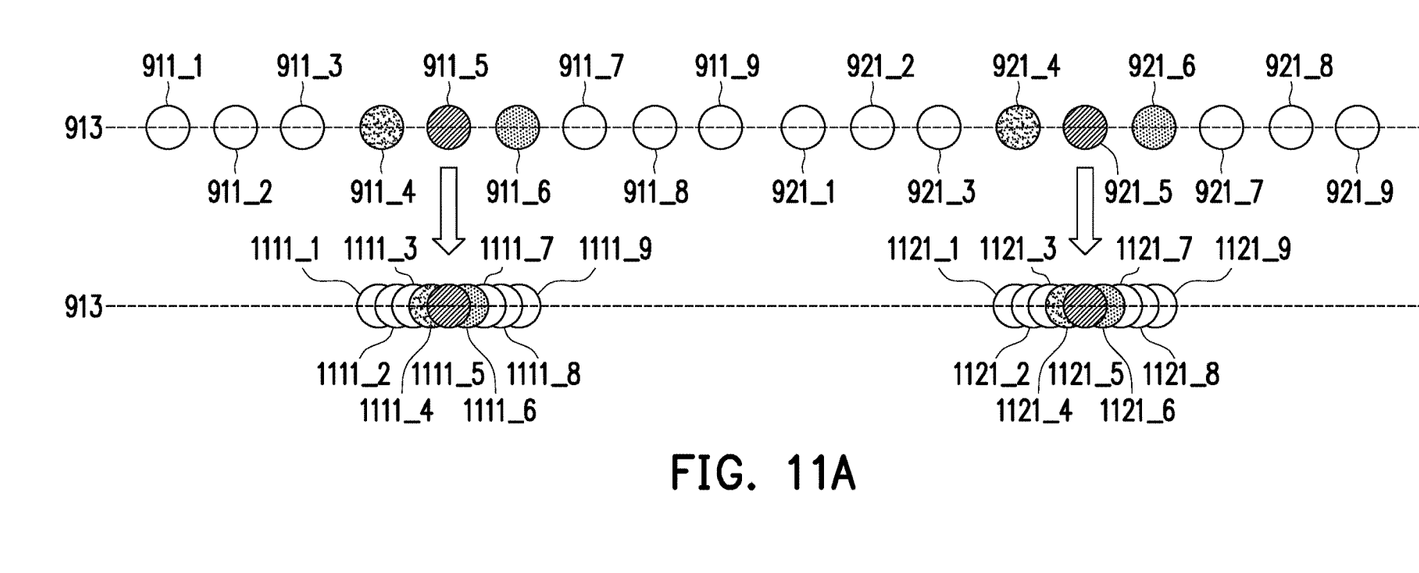
FIG. 11A is a schematic view of adjusting vision points according to an embodiment of the disclosure.
Figure 11B:
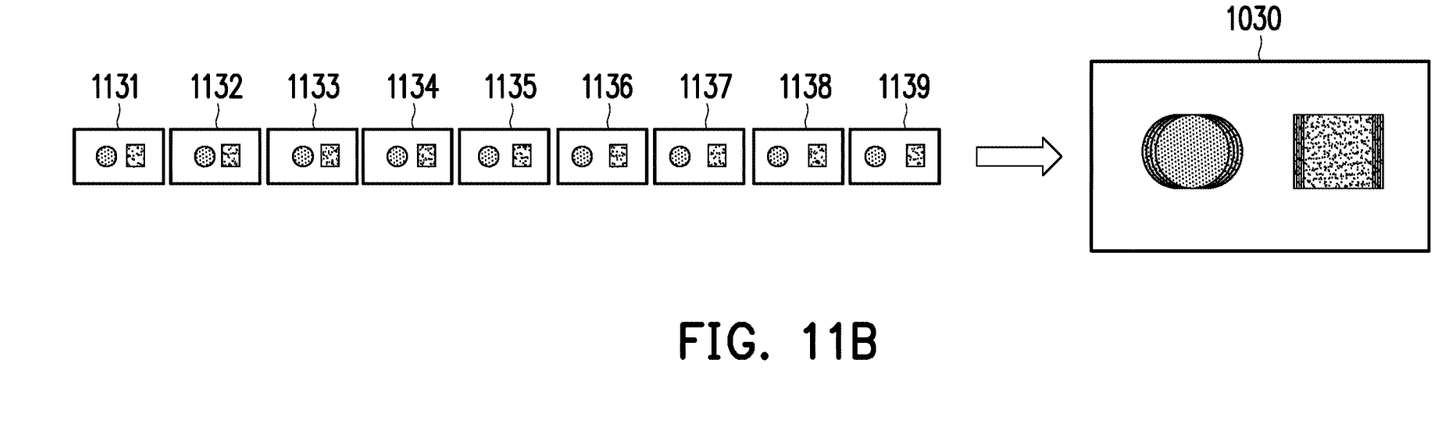
FIG. 11B is a schematic view illustrating a resultant display image observed by one eye of a viewer according to yet another embodiment of the disclosure.
Figure 11C:
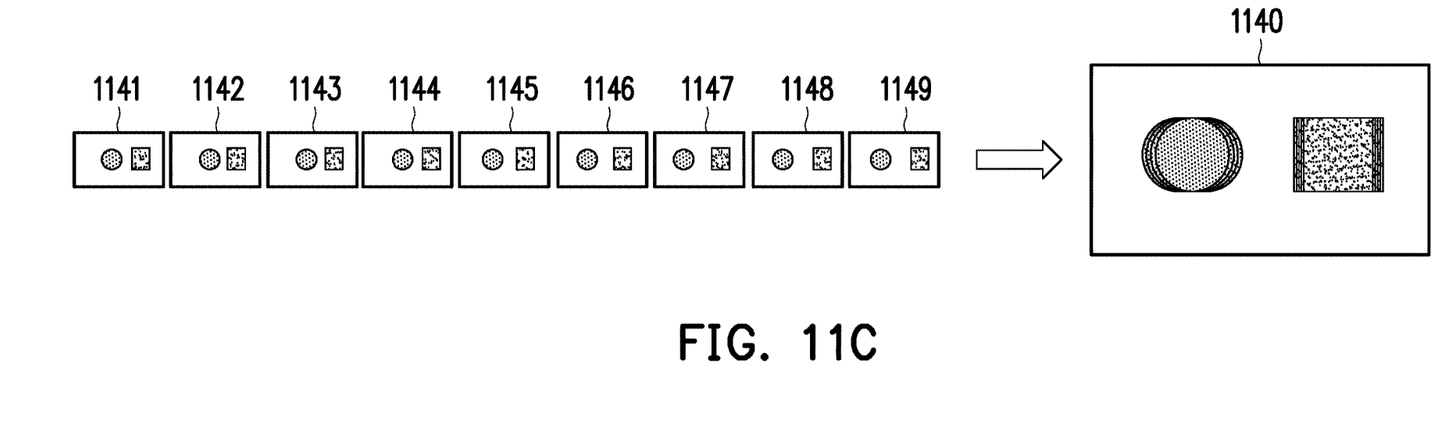
FIG. 11C is a schematic view illustrating a resultant display image observed by the other eye of the viewer according to yet another embodiment of the disclosure.

However, in an embodiment, the processor 110 may also re-define locations of the vision points 921_1-921_3 and 921_7-921_9 in a linear or non-linear manner, so that the ray casting paths corresponding to the re-defined vision points are all within the range of the pupils. With reference to FIG. 11A to FIG. 11C, FIG. 11A is a schematic view of adjusting vision points according to an embodiment of the disclosure; FIG. 11B is a schematic view illustrating a resultant display image observed by one eye of a viewer according to yet another embodiment of the disclosure; FIG. 11C is a schematic view illustrating a resultant display image observed by the other eye of the viewer according to yet another embodiment of the disclosure. As shown in FIG. 1 and FIG. 11A, in an embodiment, the processor 110 may further adjust the locations of the previously defined vision points 911_1-911_9 and 921_1-921_9. In FIG. 11A, the processor 110 may re-define the location of at least one portion of the vision points 911_1-911_9 and 912_1-912_9 previously defined along the reference line 913. Specifically, the locations of the vision points 911_1-911_9 and 912_1-912_9 may be rearranged in a linear manner as the locations of vision points 1111_1-1111_9 and 1121_1-1121_9. The vision points 1111_1-1111_9 may be arranged equidistantly and sequentially, and the vision points 1111_1-1111_9 are all located within the same range of the pupil. The vision points 1121_1-1121_9 may be arranged equidistantly and sequentially, and the vision points 1121_1-1121_9 are all located within another range of the pupil. In another embodiment, the locations of the vision points 911_1-911_9 and 912_1-912_9 may also be rearranged in a non-linear manner, so that the rearranged vision points may be arranged non-equidistantly but sequentially.

Thereby, as shown in FIG. 11A and FIG. 11B, the distance difference between the two sub-objects in the sub-images 1131-1139 displayed by the pixels corresponding to the vision points 1111_1-1111_9 in the display panel is even smaller, and therefore the eye of the viewer may actually see a display image 1130 with low view crosstalk after the sub-images 1131-1139 are superimposed. As shown in FIG. 11A and FIG. 11C, the distance difference between the two sub-objects in the sub-images 1141-1149 displayed by the pixels corresponding to the vision points 1121_1-1121_9 in the display panel is even smaller, and therefore the eye of the viewer may actually see a display image 1140 with low view crosstalk after the sub-images 1141-1149 are superimposed. Therefore, the viewer's eyes can respectively see the display screen 1130 and the display screen 1140 with clearer screen contents.

In addition, in another embodiment, the processor 110 may also re-define at least one portion of the ray casting paths, so that the ray casting paths are located within the range of the pupils. FIG. 9A is taken as an example, where the processor 110 may re-define a plurality of ray casting paths originally corresponding to the vision points 911_1-911_3 and 911_7-911_9, so as to concentrate projections to the vision points 911_4-911_6, and the processor 110 re-defines a plurality of ray casting paths originally corresponding to the vision points 921_1-921_3 and 921_7-921_9, so as to concentrate projections to the vision points 921_4-921_6. Thereby, the two eyes of the viewer may respectively see the display image 1130 and the display image 1140 which are similar to those shown in FIG. 11B and FIG. 11C and have the improved clarity.

To sum up, according to the three-dimensional image display device having the three-dimensional image display function and the three-dimensional image display method provided in one or more embodiments of the disclosure, the two-dimensional images may be superimposed to generate the three-dimensional image data, and the locations of the eyes of the viewer may be automatically sensed to calculate the ray casting paths corresponding to the locations of the eyes of the viewer. According to the display device and the display method provided in one or more embodiments of the disclosure, the display data corresponding to the ray casting paths may be calculated respectively, and the display device may project different texts and images to the eyes of the viewer respectively along the ray casting paths according to the display data, so that the viewer may see the three-dimensional image with the stereoscopic display effects.

Although the embodiments of the disclosure and the advantages thereof have been disclosed above, it should be understood that any person skilled in the art can make changes, substitutions, and modifications without departing from the spirit and scope of the disclosure, and the features of the embodiments can be arbitrarily mixed and replaced to form other new embodiments. In addition, the protection scope of the disclosure is not limited to the process, machine, manufacture, material composition, device, method, and steps in the specific embodiments described in the specification. Any person skilled in the art can understand conventional or future-developed processes, machines, manufactures, material compositions, devices, methods, and steps from the content of the disclosure as long as the same can implement substantially the same functions or achieve substantially the same results in the embodiments described herein. Therefore, the protection scope of the disclosure includes the above processes, machines, manufactures, material compositions, devices, methods, and steps. In addition, each claim constitutes a separate embodiment, and the protection scope of the disclosure further includes combinations of the claims and the embodiments. The protection scope of the disclosure should be defined by the appended claims.

What is claimed is:

1. A three-dimensional image display method, comprising:
    obtaining first volume data and respectively defining a plurality of coordinates of a plurality of voxels in the first volume data in a display device coordinate system to generate second volume data;
    obtaining two first eye coordinates and converting the two first eye coordinates to the display device coordinate system to generate two second eye coordinates;
    calculating a plurality of ray paths corresponding to a plurality of pixels of the display device;
    matching the plurality of ray paths with the two second eye coordinates to determine a plurality of ray casting paths; and
    determine a plurality of sampling data corresponding to the plurality of pixels according to the second volume data and the plurality of ray casting paths to generate display data.

2. The three-dimensional image display method according to claim 1, wherein the first volume data are composed of multi-layer two-dimensional medical image data.

3. The three-dimensional image display method according to claim 1, wherein the step of obtaining the two first eye coordinates comprises:
    sensing locations of both eyes of a viewer by a sensor to obtain the two first eye coordinates corresponding to the locations of both eyes of the viewer.

4. The three-dimensional image display method according to claim 1, wherein the plurality of ray paths corresponds to a plurality of sub-pixels of the plurality of pixels.

5. The three-dimensional image display method according to claim 1, wherein the step of determining the plurality of ray casting paths comprises:
respectively defining vision points corresponding to the two second eye coordinates; and
aligning the plurality of pixels to the vision points respectively corresponding to the two second eye coordinates to determine the plurality of ray casting paths,
wherein the vision points are located within a range of pupils.

6. The three-dimensional image display method according to claim 1, wherein the step of calculating the plurality of sampling data corresponding to the plurality of pixels comprises:
calculating a plurality of numeric values corresponding to the plurality of voxels passing through each of the plurality of ray casting paths in the second volume data to generate a plurality of composite data corresponding to the plurality of pixels; and
converting the plurality of composite data to the display data.

7. The three-dimensional image display method according to claim 1, wherein the step of determining the plurality of ray casting paths comprises:
defining a plurality of vision points respectively corresponding to the two second eye coordinates according to a range of pupils; and
respectively aligning the plurality of pixels to the plurality of vision points respectively corresponding to the two second eye coordinates to determine the plurality of ray casting paths.

8. The three-dimensional image display method according to claim 7, wherein the step of determining the plurality of ray casting paths further comprises:
re-defining at least one portion of the plurality of ray casting paths, so that the plurality of ray casting paths is located within the range of the pupils.

9. The three-dimensional image display method according to claim 7, wherein locations of the plurality of vision points are re-defined in a linear or non-linear manner, so that the plurality of ray casting paths corresponding to the re-defined plurality of vision points is located within the range of the pupils.

10. The three-dimensional image display method according to claim 7, wherein the step of determining the plurality of ray casting paths further comprises:
turning off the plurality of pixels respectively corresponding to a portion of the plurality of ray paths, wherein the portion of the plurality of ray paths are located outside the range of the pupils, but a range of rays of the portion of the plurality of ray paths covers a boundary of the range of the pupils.

11. A display device having a three-dimensional image display function, the display device comprising:
a processor, configured to obtain first volume data and respectively define a plurality of coordinates of a plurality of voxels in the first volume data in a display device coordinate system to generate second volume data; and
a sensor, coupled to the processor and configured to obtain two first eye coordinates,
wherein the processor converts the two first eye coordinates to the display device coordinate system to generate two second eye coordinates and calculates a plurality of ray paths corresponding to a plurality of pixels of the display device,
wherein the processor matches the plurality of ray paths with the two second eye coordinates to determine a plurality of ray casting paths and determines a plurality of sampling data corresponding to the plurality of pixels according to the second volume data and the plurality of ray casting paths to generate display data.

12. The display device according to claim 11, wherein the first volume data are composed of multi-layer two-dimensional medical image data.

13. The display device according to claim 11, wherein the sensor senses locations of both eyes of a viewer to obtain the two first eye coordinates corresponding to the locations of both eyes.

14. The display device according to claim 11, wherein the plurality of ray paths corresponds to a plurality of sub-pixels of the plurality of pixels.

15. The display device according to claim 11, wherein the processor respectively defines vision points corresponding to the two second eye coordinates and aligns the plurality of pixels to the vision points respectively corresponding to the two second eye coordinates to determine the plurality of ray casting paths,
wherein the vision points are located within a range of pupils.

16. The display device according to claim 11, wherein the processor calculates a plurality of numeric values corresponding to the plurality of voxels passing through each of the plurality of ray casting paths in the second volume data to generate a plurality of composite data corresponding to the plurality of pixels and convert the plurality of composite data to the display data.

17. The display device according to claim 11, wherein the processor defines a plurality of vision points respectively corresponding to the two second eye coordinates according to a range of pupils and respectively aligns the plurality of pixels to the plurality of vision points corresponding to the two second eye coordinates to determine the plurality of ray casting paths.

18. The display device according to claim 17, wherein the processor re-defines at least one portion of the plurality of ray casting paths, so that the plurality of ray casting paths is located within the range of the pupils.

19. The display device according to claim 17, wherein the processor re-defines locations of the plurality of vision points in a linear or non-linear manner, so that the plurality of ray casting paths corresponding to the re-defined plurality of vision points is located within the range of the pupils.

20. The display device according to claim 17, wherein the processor turns off the plurality of pixels respectively corresponding to a portion of the plurality of ray paths, and the portion of the plurality of ray paths are located outside the range of the pupils, but a range of rays of the portion of the plurality of ray paths covers a boundary of the range of the pupils.

* * * * *